US009955377B2

(12) United States Patent
Uchino et al.

(10) Patent No.: US 9,955,377 B2
(45) Date of Patent: Apr. 24, 2018

(54) TRANSMISSION CONTROL METHOD FOR BUFFER STATUS REPORT, USER EQUIPMENT, AND MOBILE COMMUNICATION SYSTEM

(71) Applicant: NTT DOCOMO, INC., Tokyo (JP)

(72) Inventors: Tooru Uchino, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 161 days.

(21) Appl. No.: 14/651,461

(22) PCT Filed: Nov. 11, 2013

(86) PCT No.: PCT/JP2013/080413
§ 371 (c)(1),
(2) Date: Jun. 11, 2015

(87) PCT Pub. No.: WO2014/103537
PCT Pub. Date: Jul. 3, 2014

(65) Prior Publication Data
US 2015/0319641 A1    Nov. 5, 2015

(30) Foreign Application Priority Data

Dec. 28, 2012 (JP) ................................. 2012-288898

(51) Int. Cl.
*H04W 28/02* (2009.01)
*H04W 72/04* (2009.01)
(Continued)

(52) U.S. Cl.
CPC ......... *H04W 28/0278* (2013.01); *H04L 5/001* (2013.01); *H04L 47/14* (2013.01);
(Continued)

(58) Field of Classification Search
CPC .... H04L 47/14; H04L 5/001; H04W 28/0278; H04W 72/0413; H04W 72/1231; H04W 72/1252; H04W 72/0406; H04W 72/1284
See application file for complete search history.

(56) References Cited

FOREIGN PATENT DOCUMENTS

CN    101686577 A  *  3/2010
CN    102111751 A     6/2011
(Continued)

OTHER PUBLICATIONS

International Search Report issued in PCT/JP2013/080413 dated Dec. 24, 2013 (1 page).
(Continued)

*Primary Examiner* — Erica Navar
(74) *Attorney, Agent, or Firm* — Osha Liang LLP

(57) ABSTRACT

A transmission control method for buffer status reporting includes the steps of, by a network, configuring inter-site uplink carrier aggregation based upon at least one of a data size accumulated in a buffer of user equipment in communication with a first radio base station of a serving cell or a quality of a cell under a second radio base station, sending information of the configuration of the inter-site uplink carrier aggregation from the first radio base station to the user equipment, and transmitting a buffer status report from the user equipment to the second radio base station upon configuration of the inter-site uplink carrier aggregation.

16 Claims, 10 Drawing Sheets

(51) Int. Cl.
　　　*H04L 12/801*　　(2013.01)
　　　*H04L 5/00*　　　(2006.01)
　　　*H04W 72/12*　　(2009.01)

(52) U.S. Cl.
　　　CPC ... *H04W 72/0413* (2013.01); *H04W 72/1252* (2013.01); *H04W 72/1231* (2013.01)

(56) References Cited

FOREIGN PATENT DOCUMENTS

| | | | |
|---|---|---|---|
| CN | 102387508 A | 3/2012 | |
| EP | 2775758 A1 | 9/2014 | |
| WO | 2012/108046 A1 | 8/2012 | |
| WO | WO 2013116988 A1 * | 8/2013 | ........ H04W 72/0413 |

OTHER PUBLICATIONS

Written Opinion of the International Searching Authority issued in PCT/JP2013/080413 dated Dec. 24, 2013 (3 pages).
Samsung; "Technologies for Rel-12 and Onwards"; RWS-120021, 3GPP, Jun. 12, 2012 (6 pages).
3GPP TS 36.300 V11.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Sep. 2012 (205 pages).
Office Action issued in the counterpart Japanese Patent Application No. 2012-288898, dated Oct. 25, 2016 (5 pages).
Office Action issued in corresponding Chinese Patent Application No. 201380066193.4, dated Dec. 5, 2017 (27 pages).

* cited by examiner

TRANSMISSION CONTROL METHOD FOR BUFFER STATUS REPORT, USER EQUIPMENT, AND MOBILE COMMUNICATION SYSTEM

TECHNICAL FIELD

The present invention relates to a mobile communication technology, and more particularly to a transmission control method for buffer status reports, user equipment, and a mobile communication system.

BACKGROUND ART

The third generation partnership project (3GPP) specification release 10 has introduced carrier aggregation (CA) that bundles multiple component carriers for data transmission in order to actualize wideband radio communication over 20 MHz (e.g., at 100 MHz spectrum). See, for example, 3GPP TS36.300, v11.3.0. This technique has a limitation that component carriers are bundled only among cells under a same base station or evolved node B (eNB).

On 3GPP release 12 and the subsequent releases, inter-site CA has been discussed to bundle cells under different base stations (or eNBs) for data transmission. Inter-site CA is one of expedients to achieve more flexible network architectures.

FIG. 1 illustrates a proposed architecture for inter-site CA. For example, control plane (C-plane) data transmission (signaling radio bearer) that requires reliability is carried out from a macro cell under a macro eNB 20. On the other hand, user plane (U-plane) data transmission (data radio bearer) that requires wideband communication is carrier out from a small cell under a small eNB 30. In this case, it may be expected that the macro cell is configured as a primary serving cell (referred to as a "PCell") that has high reliability, and that the small cell is configured as a secondary serving cell (referred to as a "SCell") which is an additional cell.

By introducing a small cell into a macro cell, a part of data traffic of user equipment 10 can be unloaded to the small cell. Under the situation where C-plane data and U-plane data are separated, an architecture in which the macro cell secures connectivity and mobility for the user equipment 10 using a lower frequency band, while the small cell uses a higher frequency band to improve the throughput, may be conceived.

SUMMARY OF THE INVENTION

Technical Problem to be Solved

When carrier aggregation is performed between cells under different eNBs, it may be expected that these eNBs independently manage scheduling for allocating radio resources to the user equipment (UE) 10.

However, the conventional 3GPP long term evolution (LTE) schemes only support an architecture to transmit buffer status reports (BSRs) to a single eNB. A new issue arises, namely, the data size accumulated in the UE buffer is not reported at an appropriate moment to a second eNB involved in inter-site CA.

To be more specific, under the conventional LTE schemes, the UE 10 does not transmit BSRs until a new BSR is triggered, as illustrated in FIG. 2. Even if inter-site uplink (UL) CA is configured, information about the data size accumulated in the buffer of the UE 10 is not supplied to a scheduler of the second eNB (e.g., small eNB 30) in a moment. Because of not knowing how much data are accumulated in UE 10, the small eNB 30 cannot determine the amount of uplink resources to be allocated to the UE 10.

When one of BSR conditions is satisfied in the UE 10 after a certain period of time by, for example, expiration of a periodic BSR timer, a new BSR is triggered. If the period of the BSR timer is long, time delay will occur until BSR reporting is performed.

Another possible approach is that an anchor eNB supplies information about data size in the UE buffer to the aggregated small eNB via X2 interface or S1 interface. However, again certain delay occurs due to the inter-node transmission. It is not always expected that the second eNB receives the most updated information about the buffered data size from the anchor eNB.

Means for Solving the Problem

In view of the above-noted technical problems, the present invention proposes an architecture in which the UE 10 triggers BSR reporting upon inter-site UL CA having been configured and promptly transmits a BSR to a secondary cell. This architecture is illustrated in FIG. 3.

In one aspect of the invention, a transmission control method for buffer status reporting includes the steps of by a network, configuring inter-site uplink carrier aggregation based upon at least one of a data size accumulated in a buffer of a user equipment communicating with a first radio base station of a serving cell or a quality of a cell under a second radio base station, sending information of the configuration of the inter-site uplink carrier aggregation from the first radio base station to the user equipment, and transmitting a buffer status report from the user equipment to the second radio base station upon configuration of the inter-site uplink carrier aggregation.

In another aspect of the invention, a user equipment includes a receiver to receive a notice of configuration of inter-site uplink carrier aggregation from a first radio base station, a component carrier manager to trigger buffer status reporting based on the notice and configure a second radio base station different from the first radio base station as a secondary cell, a buffer status report creator to create a buffer status report indicating an uplink data size buffered in the user equipment, and a transmitter to transmit the created buffer status report to the second radio base station.

Advantageous Effect of the Invention

A buffer status report message is promptly transmitted to a secondary eNB upon configuration of inter-site uplink carrier aggregation (UL CA).

EMBODIMENTS TO CARRY OUT THE INVENTION

The preferred embodiments are now described with reference to the attached drawings.

Figure 1:
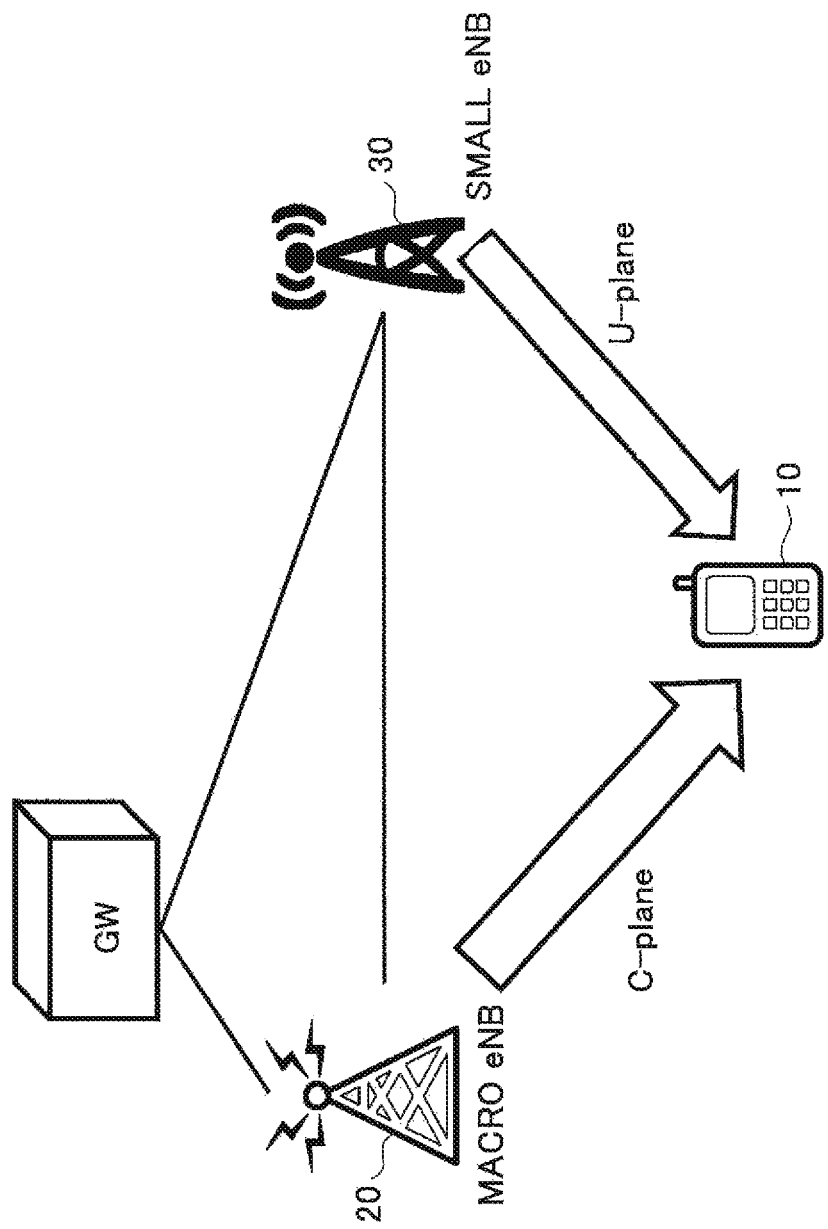
FIG. 1 illustrates small cell enhancements proposed by LTE-Advanced.
Figure 2:
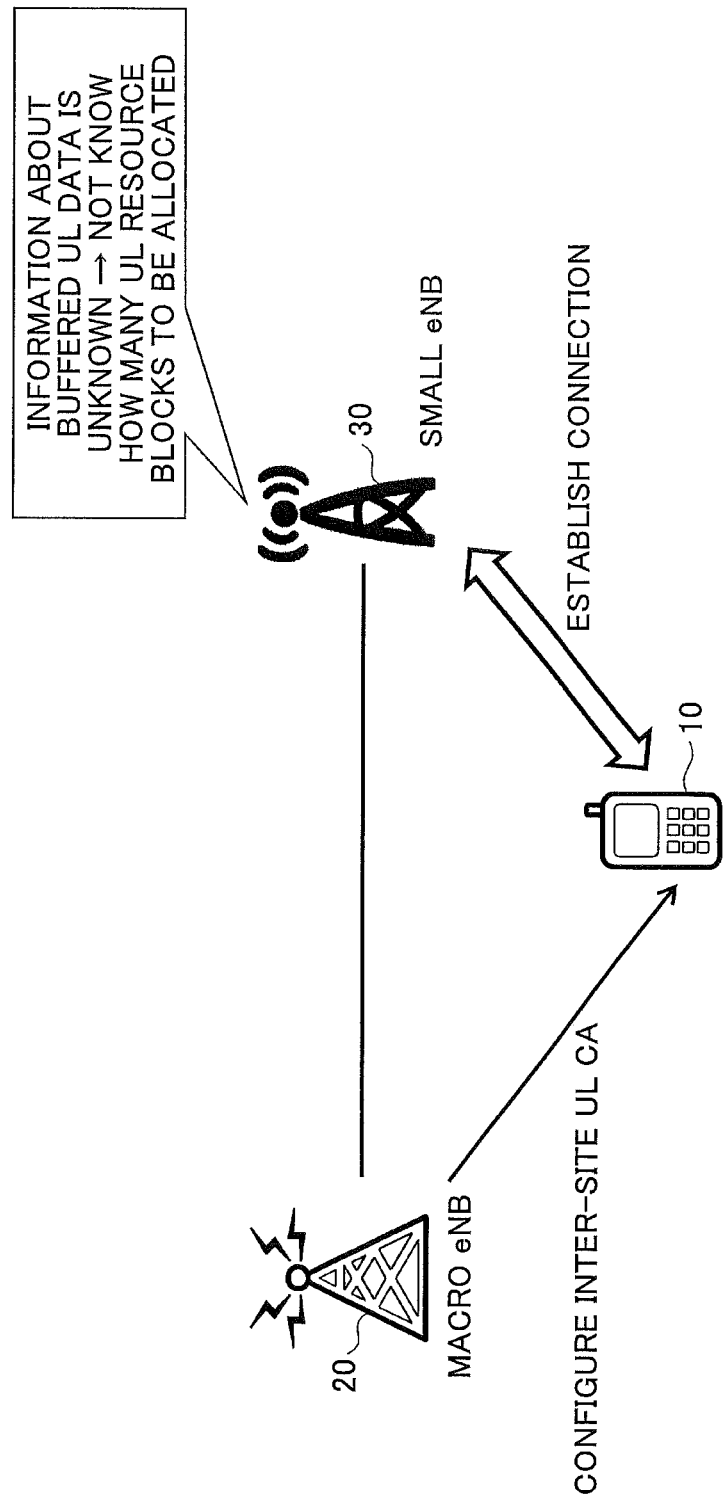
FIG. 2 illustrates a technical problem arising in inter-site uplink carrier aggregation.
Figure 3:
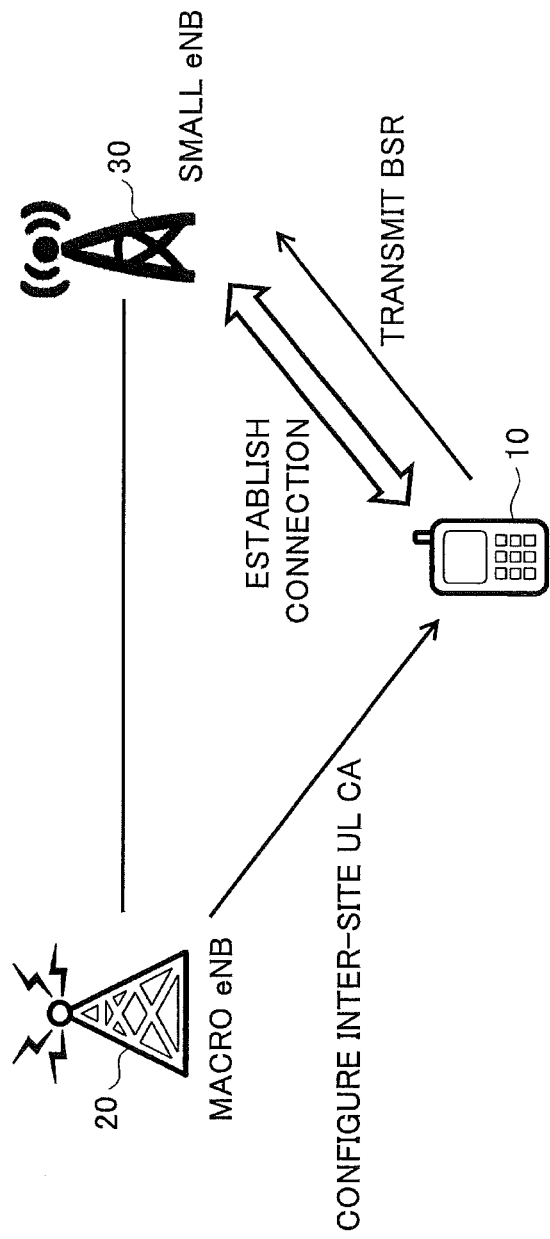
FIG. 3 illustrates a basic idea of BSR triggering according to an embodiment of the invention.

FIG. 3 illustrates a basic idea of the present invention. A macro eNB 20 is connected to a core network (not illustrated) and covers a certain geographical area. A small eNB 30 is located in or outside (or near the cell boundary of) the serving area of the macro eNB 20, and covers a geographical area smaller than that of the macro eNB 20. The macro eNB 20 and the small eNB 30 are connected to each other via a wireless channel, a wired connection, an optical fiber connection, or any other suitable media.

In the following examples, inter-site carrier aggregation is performed between a macro eNB 20 and a small eNB 30. However, the present invention is applicable to carrier aggregation between a macro eNB 30 and another macro eNB.

The macro eNB 20 that provides a macro cell and the small eNB 30 that provides a small cell are both evolved radio base stations (evolved node Bs) although they have different names according to the types. In this specification, a "small cell" may indicate a radio base station or its resources including the serving area with a coverage (or cell radius) smaller than that of a macro cell. The small cell supports a number of connections fewer than that of a macro cell, and it may include a pico-cell and a femto-cell. A "small eNB" is a small-cell type radio base station with a physical size and a transmission power smaller than those of a macro-cell type radio base station. A "small eNB" may be occasionally used as a "small cell". For convenience sake, the small eNB 30 is smaller than macro eNB 20 in size including a serving area size, the number of acceptable connections, a physical size, transmission power, etc.

The macro eNB 20 controls connectivity between the user equipment 10 and the macro eNB 20, as well as connectivity between the user equipment 10 and the small eNB 30. When the macro eNB 20 configures inter-site uplink CA, it transmits a control signal to the user equipment 10 instructing the user equipment 10 to configure an uplink secondary cell (referred to as "UL SCell") for the inter-site uplink CA. Upon receiving the control signal, the user equipment 20 starts a procedure for establishing connection with the small eNB 30.

In the embodiment, upon configuration of the inter-site uplink CA, the user equipment 10 triggers BSR reporting to the small eNB 30 in association with the procedure for establishing connection with the small eNB 30. To be more precise, the user equipment 10 triggers a BSR at an arbitrary moment between reception of the control signal instructing UL SCell configuration from the macro eNB 20 and completion of uplink synchronization with the small eNB 30 (i.e., completion of the random access procedure). The BSR triggering timing will be described in details below.

With this arrangement, a counterpart cell eNB (the small eNB 30 in this example) involved in inter-site uplink carrier aggregation can receive the most updated information about the data size accumulated in the buffer of the user equipment 10. Once an appropriate quantity of uplink resources is allocated by the small eNB 30 to the user equipment 10, the user equipment 10 unloads a part of uplink data transmission from the macro eNB 20 to the small eNB 30. Consequently, the traffic load on the macro eNB 20 is reduced and the radio environment encompassing the other users accessing to the macro eNB 20 is improved.

Figure 4:
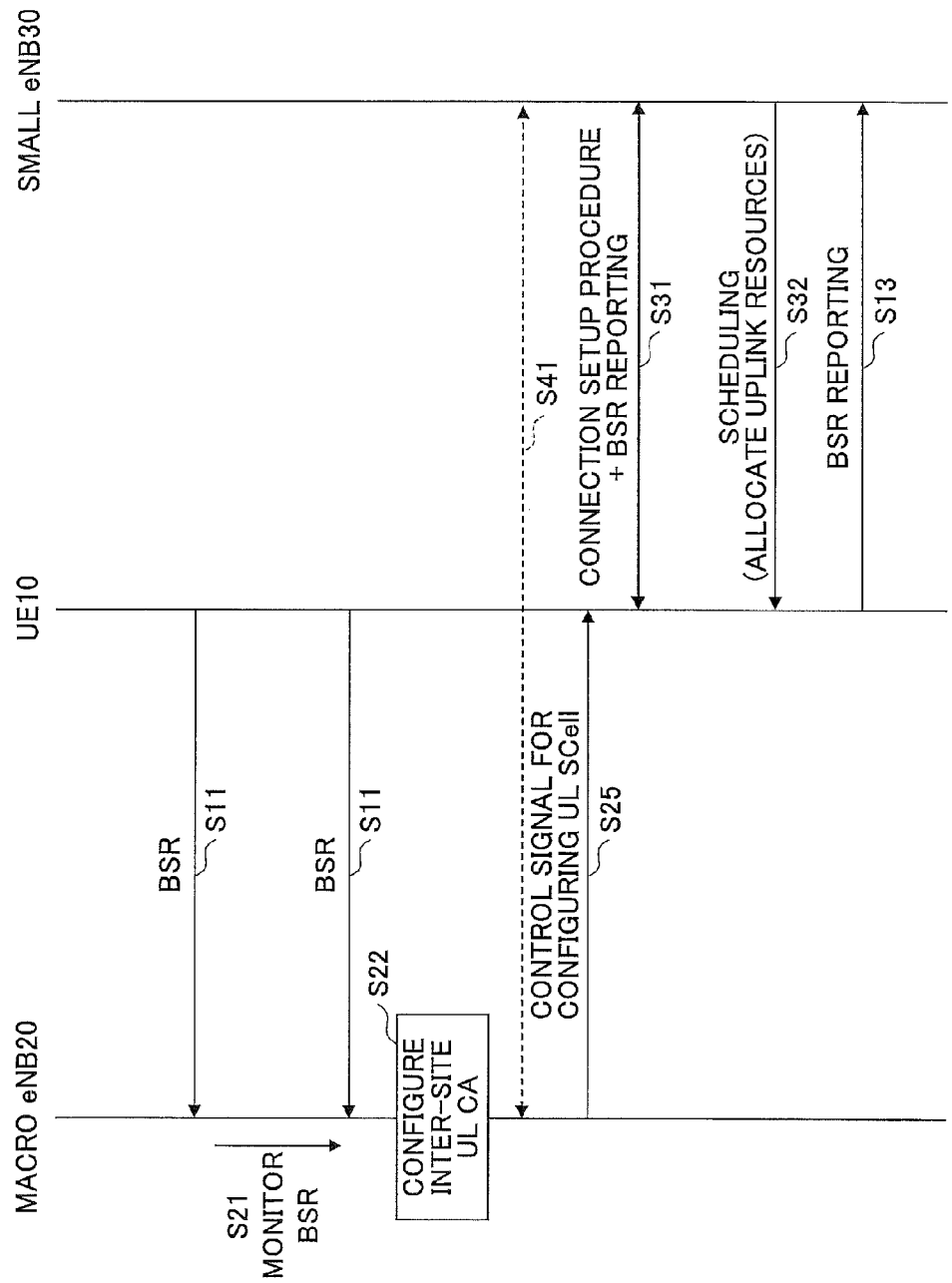
FIG. 4 is a sequence diagram of BSR reporting carried out among a macro eNB, user equipment, and a small eNB.

FIG. 4 is a sequence diagram of BSR reporting carried out between the macro eNB 20, the user equipment 10 and the small eNB 30 of FIG. 3.

First, the user equipment 10 in communication with the macro eNB 20 transmits a BSR periodically to the macro eNB 20 (S11). The BSR is information indicating a data size accumulated in a logical channel buffer or a logical channel group buffer of the user equipment 10. In reporting the data size in the logical channel group buffer, the data sizes in four logical channel groups #1 to #4 are reported associated with the corresponding logical channel group numbers. The BSR is transmitted using an uplink component carrier for a physical uplink channel allocated by the macro eNB 20.

The macro eNB 20 monitors the BSRs transmitted from the user equipment 10 (S21), and configures inter-site uplink CA based upon the monitoring result (S22). Inter-site uplink CA is configured based on, for example, the reception conditions of the BSRs, the reported data sizes, a direction of changing in the buffered data sizes, and so on. If inter-site uplink CA is configured, the macro eNB 20 transmits a control signal instructing UL SCell setup to the user equipment 10 (S25). The control signal may or may not include information of specifying a secondary cell to be configured. To include the control signal specifying a secondary cell to be set up in the control signal, the radio resource control (RRC) entity of the macro eNB 20 selects and designates a small cell available for uplink communication with the user equipment 10 as the secondary cell based upon the radio resource conditions. If the secondary cell specifying information is not included in the control signal, component carrier candidates information may be included together with the UL Scell setup instruction in the control signal. In the latter case, the user equipment 10 may measure the candidate component carriers to select and add a secondary cell. Then, the user equipment 10 reports the completion of SCell setup to the macro eNB 20.

If the macro eNB 20 controls connectivity between the user equipment 10 and the small eNB 30, the macro eNB 20 transmits the control signal for UL SCell setup only to the user equipment 10. Alternatively, prior to step S25, the macro eNB 20 may negotiate with the small eNB 30 for configuring inter-site uplink CA (S41). If the negotiation is successful, the macro eNB 20 designates the small eNB 30 as a secondary cell. The interface between the macro eNB 20 and the small eNB 30 may be an existing X2 interface or a newly introduced interface. The negotiation step (S41) is optional and it may be skipped depending on the network architecture, the performance of the small eNB 30, the contents of the control signal of instructing UL SCell setup, etc.

Upon receiving the instruction of inter-site uplink CA from the macro eNB 20, the user equipment 10 triggers BSR reporting to transmit a BSR to the small eNB 30 in association with the procedure for establishing connection between the small eNB 30 (S31).

The small eNB 30 allocates one or more uplink component carriers to the user equipment 10 according to the buffered data size indicated in the BSR (S32). The allocated component carriers may be at a frequency band different from that supported by the macro eNB 20. The user equipment 10 transmits BSRs to the small eNB 30 using the uplink resources allocated by the small eNB 30 as long as the small eNB 30 is added and maintained as the secondary cell for user data transmission (S13).

With this architecture, BSRs are supplied to the small eNB 30 earlier than the next BSR timing such as expiration of a timer coming. Uplink component carriers are promptly allocated to the user equipment upon configuration of the inter-site uplink CA.

Figure 5:
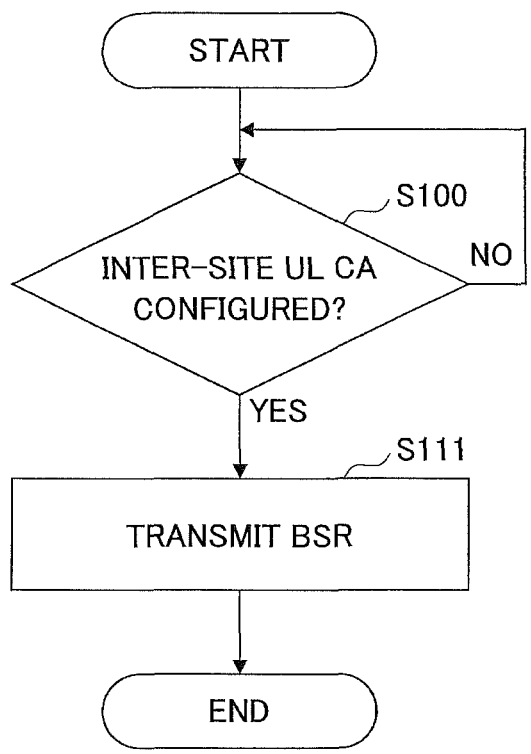
FIG. 5 is a flowchart illustrating BSR triggering timing at the user equipment.

FIG. 5 is a basic flowchart of determining a BSR transmission timing upon configuration of inter-site UL CA. The user equipment 10 determines whether inter-site UL CA has been configured (S100). If inter-site UL CA has been configured (YES in S100), the user equipment 10 triggers BSR reporting, regardless of whether a periodic BSR triggering condition is satisfied, and transmits a BSR to the eNB of the secondary cell, namely, small eNB 30 in this example (S111).

This BSR reporting is performed toward an appropriate eNB at an appropriate moment upon configuration of inter-site UL CA.

Figure 6:
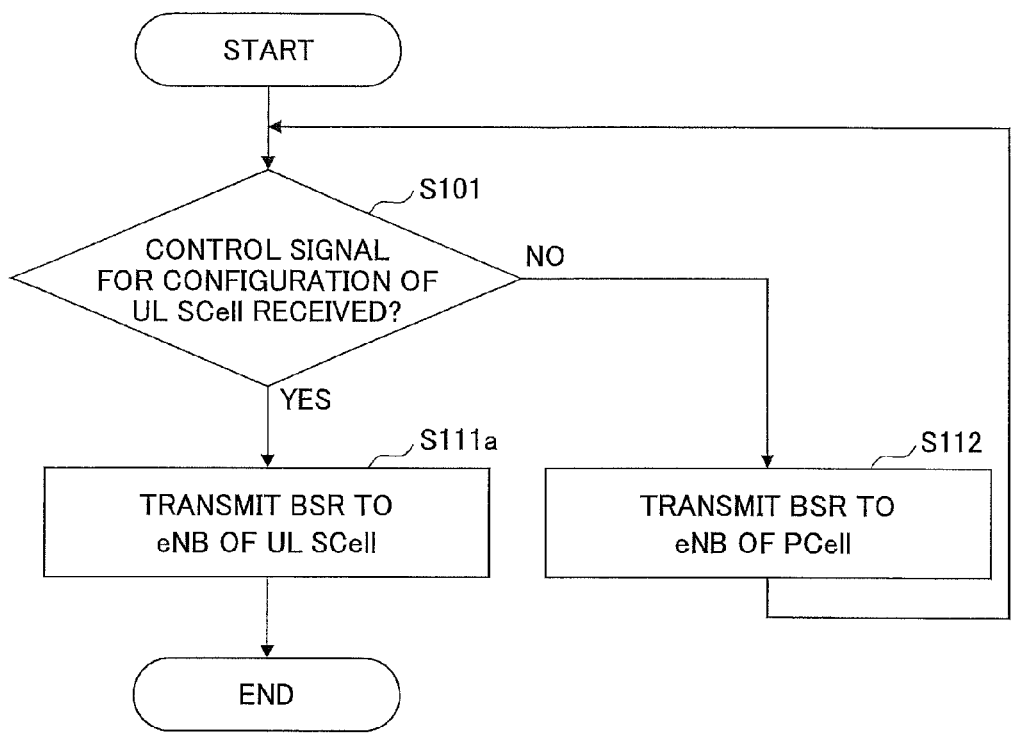
FIG. 6 illustrates an example of the BSR triggering timing.

FIG. 6 through FIG. 9 illustrate examples of BSR trigging timing. In the arrangement of FIG. 6, the user equipment 10 triggers BSR reporting at the time of reception of a control signal for UL SCell setup. First, the user equipment 10 determines whether a control signal for UL SCell setup has been received (S101). If a control signal for UL SCell setup has been received (YES in S101), the user equipment 10 transmits a request for connection establishment to the eNB (small eNB 30 in this example) of a secondary cell designated in the control signal, simultaneously with BSR reporting (S111a).

If the control signal for UL SCell setup has not been received (NO in S101), the user equipment keeps on transmitting BSRs to the eNB (macro eNB 20 in this example) of the primary cell (S112). The judgment in S101 may be made by determining whether a secondary cell has been configured, in place of the determination of presence or absence of the control signal. In this case, the BSR is transmitted to the eNB (i.e., the small eNB 30) of the secondary cell upon completion of secondary cell setup.

Figure 7:
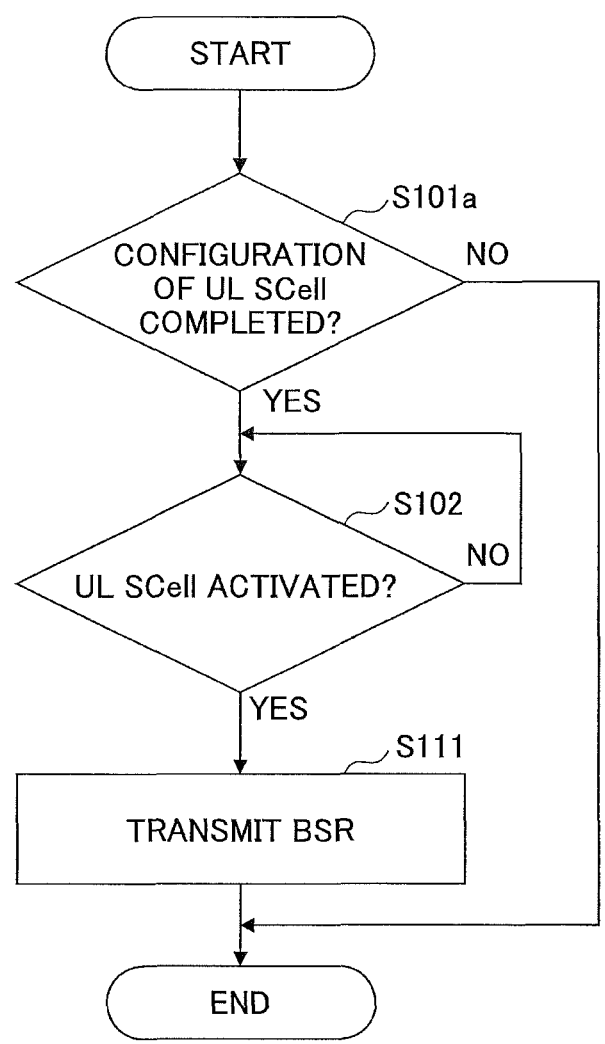
FIG. 7 illustrates another example of the BSR triggering timing.

FIG. 7 illustrates another example of BSR triggering timing. The user equipment 10 determines whether the secondary cell setup procedure has been completed according to the control signal (S101a). If the secondary cell setup procedure has been completed (YES in S101a), then the user equipment 10 determines whether the secondary cell has been made "Active" (S102). If the secondary cell has been made "Active" (YES in S102), the user equipment 10 transmits a BSR to the eNB (i.e., the small eNB 30) of the secondary cell (S111).

Scheduling has not been done yet only when the secondary cell has just been configured. Accordingly, in this example, BSR reporting is carried out when allocation of an uplink resource becomes more ensured.

Figure 8:
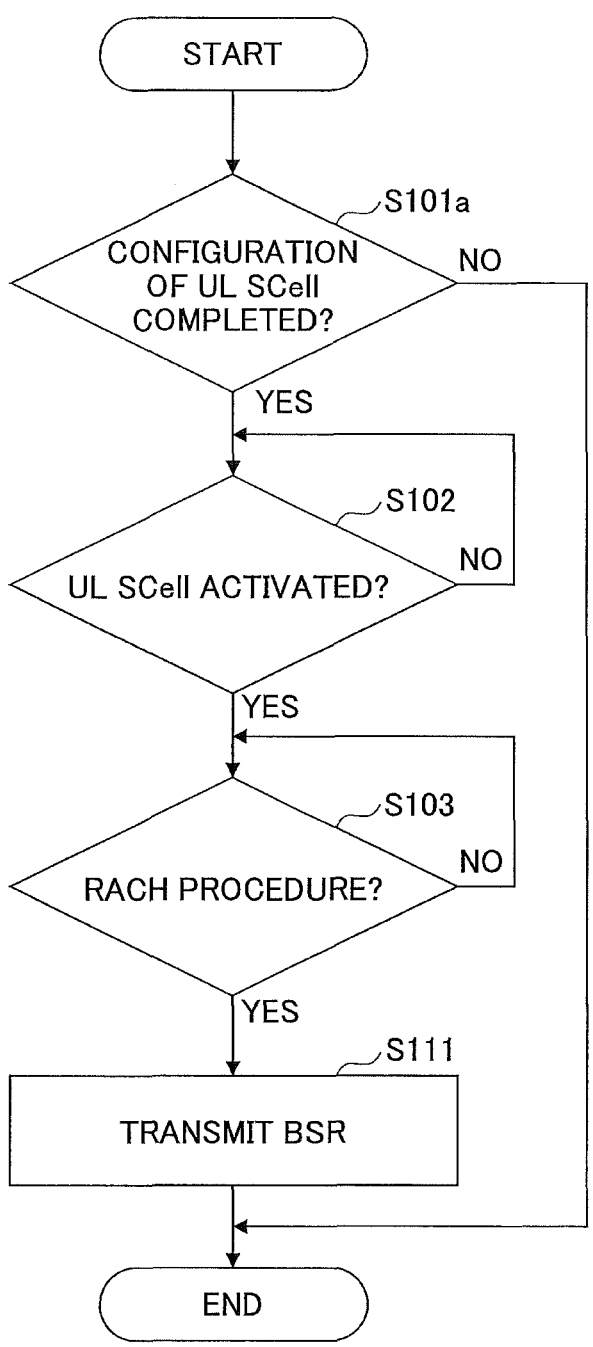
FIG. 8 illustrates still another example of the BSR triggering timing.

FIG. 8 illustrates still another example of BSR triggering timing. The user equipment 10 determines whether the secondary cell setup procedure has been completed according to the control signal (S101a). If the secondary cell setup procedure has been completed (YES in S101a), then the user equipment 10 determines whether the secondary cell has been made "Active" (S102). If the secondary cell has been made "Active" (YES in S102), the user equipment 10 determines whether a random access channel (RACH) procedure has been started (S103). If the RACH procedure has been started (YES in S103), the user equipment 10 transmits a BSR to the eNB (i.e., the small eNB 30) of the secondary cell (S111) at the moment when a RACH preamble is transmitted. Instead of triggering the BSR reporting upon starting of the RACH procedure, the BSR reporting may be performed at an arbitrary moment during the RACH procedure. For example, the BSR reporting may be carried out upon receiving a RACH response for the RACH preamble, using an uplink resource allocated by the RACH response.

Figure 9:
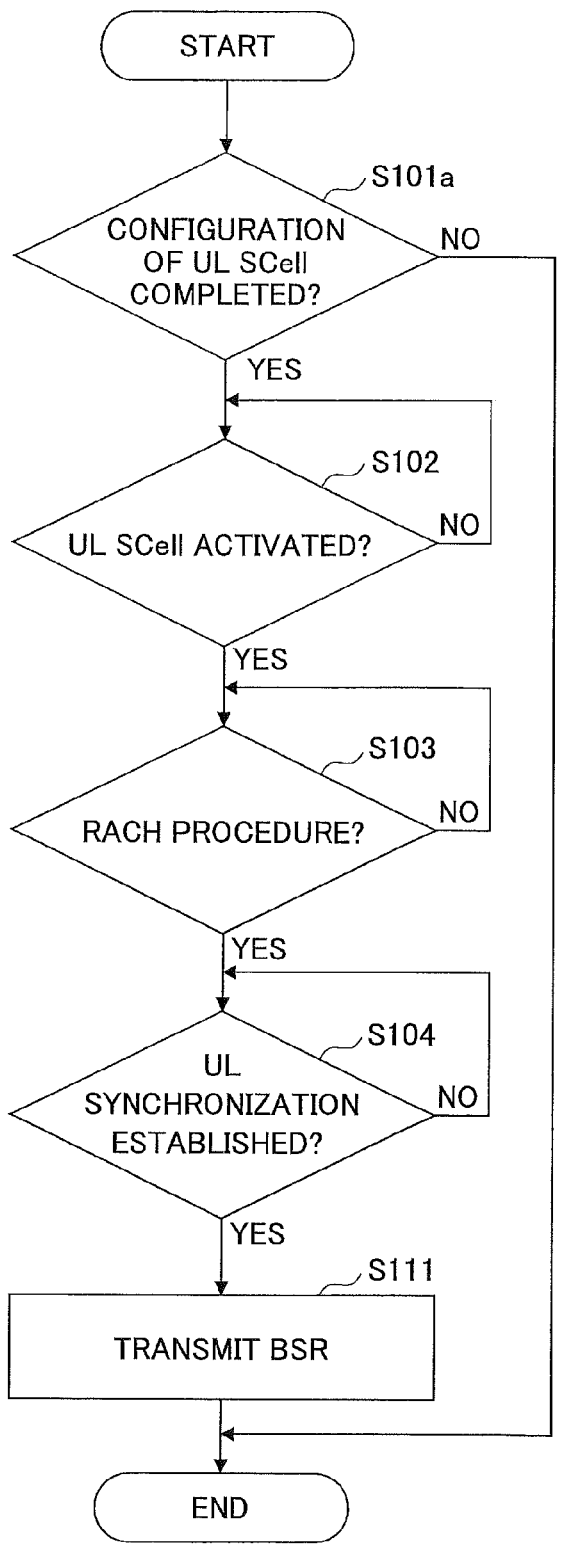
FIG. 9 illustrates yet another example of the BSR triggering timing.

FIG. 9 illustrates yet another example of BSR triggering timing. If the secondary cell setup procedure has been completed according to the control signal (YES in S101a), if the secondary cell has been made "Active" (YES in S102), and if a RACH procedure has been started (YES in S103), then the user equipment 10 determines whether uplink synchronization with the secondary cell has been established (S104). If the uplink synchronization with the secondary cell has been established upon completion of the RACH procedure (YES in S104), the user equipment 10 transmits a BSR to the eNB (small eNB 30) of the secondary cell (S111). Once the synchronization has been established between the user equipment 10 and the secondary cell, scheduling is actually carried out. Accordingly, the most updated information about the buffered data size can be transmitted to the eNB of the secondary cell.

As explained in the foregoing, any one of the following BSR triggering timings may be employed by the user equipment upon configuration of inter-site UL CA:
(1) at the moment of reception of a control signal for UL SCell setup or completion of the UL SCell setup;
(2) at the moment of activation of the configured SCell;
(3) in a RACH procedure with respect to the configured SCell or a SCell group to which the configured SCell belongs (at any stage during the RACH procedure, such as a moment when the RACH procedure is started); or
(4) at the moment of establishing uplink synchronization with the SCell.

Figure 10:
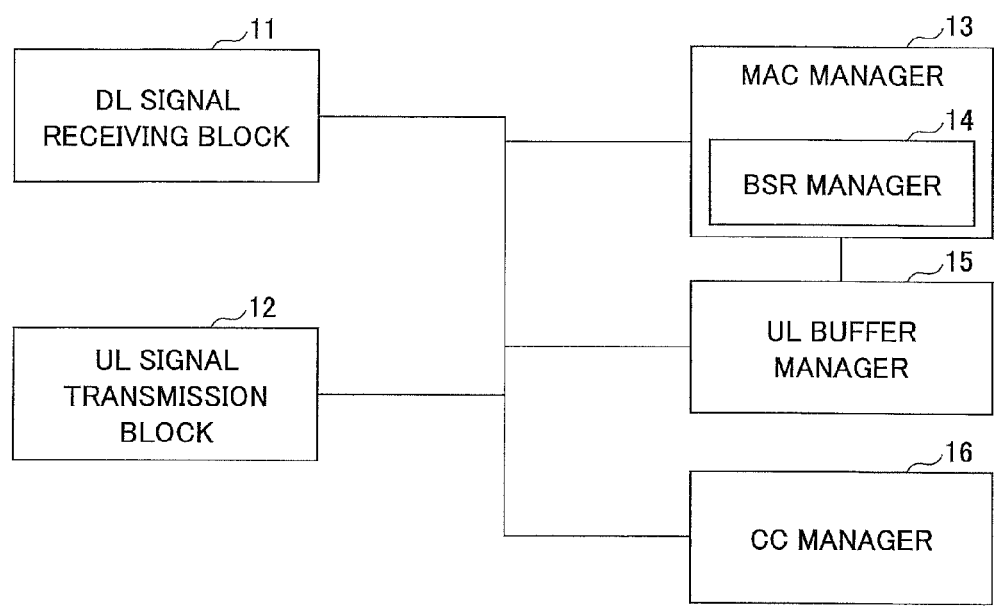
FIG. 10 illustrates a structure of the user equipment.

FIG. 10 is a schematic diagram of the user equipment 10. The user equipment 10 has a downlink (DL) signal receiving block 11, an uplink (UL) signal transmission block 12, a media access control (MAC) manager 13, an uplink (UL) buffer manager 15, and a component carrier (CC) manager 16.

The DL signal receiving block 11 receives a downlink radio signal via an antenna (not illustrated). The UL signal transmission block 12 transmits an uplink radio signal via the antenna. Since the antenna and a baseband processor are not directly relevant to the present invention, these devices are omitted from FIG. 10. The radio frequency (RF) sides of the DL signal receiving block 11 and the UL signal transmission block 12 are connected to one or more antenna elements. The baseband sides of the DL signal receiving block 11 and the UL signal transmission block 12 are connected to a baseband processor (including a digital signal processor).

In order to establish communications independently with the macro eNB 20 and the small eNB 30, the DL signal receiving block 11 may have two or more RF signal receiving blocks corresponding to different frequency bands (such as 2 GHz band and 3.5 GHz band). Similarly, the UL signal transmission block 12 may have two or more RF transmission blocks corresponding to different frequency bands.

The MAC manager 13 has a BSR manager 14. The MAC manager 13 carries out generation and processing of a MAC protocol data unit (PDU), management of hybrid automatic repeat request (HARQ), management and controlling of RACH procedures, and so on. The BSR manager 14 generates and processes BSRs. The UL buffer manager 15 monitors uplink data size in the buffer and reports the uplink data size to the BSR manager 15.

The component carrier manager 16 monitors whether carrier aggregation including inter-site UL CA has been configured, and triggers BSR reporting upon configuration of inter-site UL CA. The component carrier manager 16 also manages component carriers, selects one or more component carriers for communication, configures a SCell, and controls activating and deactivating.

In exemplified operations of the user equipment 10, upon receiving, at the DL signal receiving block 11, a notice of inter-site UL CA configuration (that is, a control signal instructing UL SCell configuration) from the macro eNB 20, the component carrier manager 17 determines BSR triggering timing. The BSR manager 14 creates a BSR for each of the logical channels or logical channel groups indicating a buffered data size based upon information about the data size accumulated in the buffer supplied from the UL buffer manager 15. The created BSR is transmitted from the UL signal transmission block 12 to the small eNB that is a target of the UL SCell configuration.

In this manner, the user equipment 10 can transmits a BSR to the "UL SCell" configured small eNB 30 for the inter-site UL CA earlier than the convention BSR triggering timing such as expiration of a timer.

In the embodiment, the macro eNB 20 determines to start inter-site UL CA based upon BSR reporting from the user equipment 10. However, the invention is not limited to this example. An arbitrary node on the network can determine starting of inter-site UL CA based on the information about a data size in a buffer of the user equipment 10. Inter-site UL CA is not limited to one between a macro eNB and a small eNB, but is equally applicable to that between different macro eNBs.

In the embodiment inter-site UL CA is configured based on information about a data size in UE buffer. However, the inter-site UL CA may be configured based on the radio link quality of a small cell.

Although the embodiment has been described using an exemplified situation where inter-site UL CA is started, the invention is applied to a scene where inter-site UL CA is finished. If the quality of a radio link of a cell under the secondary eNB (e.g., the small eNB 30) has been degraded, it is desirable to finish transmission on that degraded link and return data transmission of the bearer having been transmitted under the small eNB to the macro eNB. In this case, the user equipment 10 can supply the most updated buffer information of accumulated data size to the macro eNB upon resuming transmission with respect to the macro eNB, thereby reducing scheduling delay. The termination of communication in a cell under the small eNB and the restart of transmission to the macro eNB may be reported to the user equipment 10 from the network.

The present international application is based on and claims the benefit of priority of Japanese Patent Application No. 2012-288898, filed Dec. 28, 2012, the entirety of the contents of which are incorporated herein by reference.

The present invention is applied to a mobile communication system that performs inter-cell or inter-site carrier aggregation.

LIST OF REFERENCE SYMBOLS

10: User Equipment
11: DL Signal Receiver
12: UL Signal Transmitter
13: MAC Manager
14: BSR Manager
15: UL Buffer Manager
16: Component Carrier (CC) manager
20: Macro eNB
30: Small eNB

The invention claimed is:

1. A transmission control method for buffer status report, comprising:
    configuring inter-site uplink carrier aggregation based upon at least one of a data size accumulated in a buffer of a user equipment communicating with a first radio base station of a serving cell or a quality of a cell under a second radio base station;
    sending information of the configuration of the inter-site uplink carrier aggregation from the first radio base station to the user equipment;
    upon configuration of the inter-site uplink carrier aggregation, triggering buffer status reporting from the user equipment to the second radio base station;
    transmitting a buffer status report from the user equipment to the second radio base station in association with a procedure for establishing the connection with the second radio base station;
    at the user equipment, receiving a communication message instructing termination of the connection with the second radio base station and communication to continue with the first radio base station when the quality of the cell under the second radio base station has degraded after the buffer status report is transmitted from the user equipment to the second radio base station; and
    transmitting the buffer status report from the user equipment to the first radio base station upon reception of the communication message.

2. The transmission control method as claimed in claim 1, wherein
    the first radio base station configures the inter-site uplink carrier aggregation according to the data size accumulated in the buffer of the user equipment,
    the method further comprising:
    transmitting a control signal from the first radio base station to the user equipment to instruct the user equipment to configure the second radio base station;
    at the user equipment, configuring the second radio base station for the inter-site uplink carrier aggregation in response to the control signal; and
    transmitting the buffer status report from the user equipment to the second radio base station.

3. The transmission control method as claimed in claim 2, wherein
    by the user equipment, triggering the buffer status reporting to the second radio base station upon receiving the control signal, and
    transmitting the buffer status report from the user equipment to the second radio base station.

4. The transmission control method as claimed in claim 2, wherein
    by the user equipment, triggering the buffer status reporting to the second radio base station upon completion of configuration of the second radio base station, and
    transmitting the buffer status report from the user equipment to the second radio base station having been configured for the inter-site uplink carrier aggregation.

5. The transmission control method as claimed in claim 4, wherein by the user equipment, triggering the buffer status reporting to the second radio base station if the configured second radio base station is in an active state, and transmitting the buffer status report from the user equipment to the second radio base station.

6. The transmission control method as claimed in claim 5, wherein by the user equipment, triggering the buffer status reporting to the second radio base station in a random access procedure with respect to the active second radio base station, and transmitting the buffer status report from the user equipment to the second radio base station.

7. The transmission control method as claimed in claim 6, wherein by the user equipment, triggering the buffer status reporting to the second radio base station upon establishing uplink synchronization with the second radio base station when the random-access procedure is completed, and transmitting the buffer status report from the user equipment to the second radio base station upon establishment of the connection with the second radio base station.

8. The transmission control method as claimed in claim 1, further comprising:

transmitting user plane data to the second radio base station using an uplink resource allocated by the second radio base station according to the buffer status report.

9. A user equipment comprising:

a receiver to receive a notice of configuration of inter-site uplink carrier aggregation from a first radio base station;

a processor that triggers buffer status reporting based on the notice and configure a second radio base station that is different from the first radio base station as a secondary cell, and that creates a buffer status report indicating an uplink data size buffered in the user equipment; and a transmitter to transmit the created buffer status report to the second radio base station, wherein configuration of the inter-site uplink carrier aggregation triggers buffer status reporting, and the transmitter transmits the buffer status report from the user equipment to the second radio base station in association with a procedure for establishing the connection with the second radio base station, wherein the user equipment receives a communication message instructing termination of the connection with the second radio base station and communication to continue with the first radio base station when the cell quality of the second radio base station has degraded after the buffer status report is transmitted from the user equipment to the second radio base station, and wherein the user equipment transmits the buffer status information to the first radio base station upon the reception of the communication message.

10. The user equipment as claimed in claim 9, wherein the processor triggers buffer status reporting to the second radio base station when the receiver receives a control signal from the first radio base station, the control signal instructing the user equipment to configure the second radio base station for the inter-site uplink carrier aggregation.

11. The user equipment as claimed in claim 10, wherein the processor determines whether the second radio base station has been configured in response to the control signal, and triggers the buffer status reporting to the second radio base station upon completion of configuration of the second radio base station.

12. The user equipment as claimed in claim 11, wherein the processor determines whether the configured second radio base station is in an active state, and triggers the buffer status reporting with respect to the second radio base station if the second radio base station is in the active state.

13. The user equipment as claimed in claim 12, wherein the processor triggers the buffer status reporting to the second radio base station in a random access procedure with respect to the second radio base station.

14. The user equipment as claimed in claim 13, wherein the processor triggers the buffer status reporting to the second radio base station when the random access procedure has been completed and uplink synchronization with the second radio base station is established.

15. The user equipment as claimed in claim 9, wherein the transmitter transmits user plane data to the second radio base station using an uplink resource allocated by the second radio base station according to the buffer status report.

16. A mobile communication system comprising:

a first radio base station;

a user equipment in communication with the first radio base station under control of the first radio base station; and a second radio base station different from the first radio base station, wherein the first radio base station informs the user equipment of configuration of inter-site uplink carrier aggregation based upon at least one of a data size accumulated in a buffer of the user equipment or a quality of a cell under the second radio base station, wherein the user equipment triggers buffer status reporting upon configuration of the inter-site uplink carrier aggregation, configures the second radio base station as a target of the inter-site uplink carrier aggregation, and transmits a buffer status report to the second radio base station in association with a procedure for establishing the connection with the second radio base station, wherein the user equipment receives a communication message instructing termination of the connection with the second radio base station and communication to continue with the first radio base station when the cell quality of the second radio base station has degraded after the buffer status report is transmitted from the user equipment to the second radio base station, and wherein the user equipment transmits the buffer status information to the first radio base station upon the reception of the communication message.

* * * * *